United States Patent
Kawai

(10) Patent No.: US 9,664,818 B2
(45) Date of Patent: May 30, 2017

(54) POLYCARBONATE RESIN COMPOSITION AND MOLDED POLYCARBONATE RESIN

(75) Inventor: Naoyuki Kawai, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 13/699,673

(22) PCT Filed: May 26, 2011

(86) PCT No.: PCT/JP2011/062137
§ 371 (c)(1),
(2), (4) Date: Nov. 23, 2012

(87) PCT Pub. No.: WO2011/149030
PCT Pub. Date: Dec. 1, 2011

(65) Prior Publication Data
US 2013/0066002 A1    Mar. 14, 2013

(30) Foreign Application Priority Data

May 27, 2010 (JP) ................... 2010-121932
May 27, 2010 (JP) ................... 2010-121933

(51) Int. Cl.
 *C08L 69/00* (2006.01)
 *G02B 1/04* (2006.01)
 (Continued)

(52) U.S. Cl.
 CPC .............. *G02B 1/04* (2013.01); *C08L 69/00* (2013.01); *C08K 5/42* (2013.01); *C08K 5/524* (2013.01);
 (Continued)

(58) Field of Classification Search
 CPC .......... C08L 69/00; C08L 27/18; C08L 83/04; C08L 2205/03; C08L 2666/78;
 (Continued)

(56) References Cited

U.S. PATENT DOCUMENTS

2006/0159926 A1* 7/2006 Funaki et al. ............... 428/412
2007/0257401 A1* 11/2007 Nakagawa et al. ........ 264/328.1
(Continued)

FOREIGN PATENT DOCUMENTS

JP   8-176425 A    7/1996
JP   2000-26616 A  1/2000
(Continued)

OTHER PUBLICATIONS

Machine translation of JP 2010065164 A, published Mar. 25, 2010, Kadota et al.*

(Continued)

*Primary Examiner* — Jane L Stanley
(74) *Attorney, Agent, or Firm* — Oblon, McClelland, Maier & Neustadt, L.L.P.

(57) ABSTRACT

Provided is a polycarbonate resin composition capable of providing a molded body that has a high light transmittance and high light-diffusing property, can be inhibited from yellowing, and has high thin-wall flame retardancy, and a polycarbonate resin molded body obtained by molding the polycarbonate resin composition. The flame-retardant light-diffusing polycarbonate resin composition has a viscosity-average molecular weight of 17,000 or more and includes, with respect to 100 parts by mass of a polycarbonate (A) formed of 10 to 100 parts by mass of a branched polycarbonate (A-1) and 90 to 0 parts by mass of an aromatic polycarbonate (A-2), 0.1 to 5 parts by mass of a light diffuser (B), 0.01 to 1.0 part by mass of a flame retardant (C), 0 to 0.5 part by mass of a polytetrafluoroethylene (D), and 0 to 2 parts by mass of a polyorganosiloxane (E), and the polycarbonate resin molded body is obtained by molding the polycarbonate resin composition.

40 Claims, 1 Drawing Sheet

(51) Int. Cl.

| | | |
|---|---|---|
| C08K 5/42 | (2006.01) | |
| C08K 5/524 | (2006.01) | |
| C08K 5/527 | (2006.01) | |
| C08K 5/549 | (2006.01) | |
| C08L 27/18 | (2006.01) | |
| C08L 33/06 | (2006.01) | |

(52) U.S. Cl.
CPC .............. *C08K 5/527* (2013.01); *C08K 5/549* (2013.01); *C08L 27/18* (2013.01); *C08L 33/06* (2013.01); *C08L 2205/02* (2013.01)

(58) Field of Classification Search
CPC ....... C08L 2666/84; C08K 5/13; C08K 13/02; C08K 5/42; C08K 3/0041; C08K 3/0058; G02B 1/04
USPC ........................................................ 524/611
See application file for complete search history.

(56) References Cited

U.S. PATENT DOCUMENTS

| | | | |
|---|---|---|---|
| 2008/0149164 A1* | 6/2008 | Goedmakers et al. ....... | 136/247 |
| 2009/0118406 A1* | 5/2009 | Tomoda ........................ | 524/284 |
| 2009/0185363 A1* | 7/2009 | Ishikawa ...................... | 362/97.1 |
| 2009/0258170 A1* | 10/2009 | Kawagoshi et al. ......... | 428/1.32 |
| 2010/0286321 A1 | 11/2010 | Isozaki et al. | |

FOREIGN PATENT DOCUMENTS

| | | | |
|---|---|---|---|
| JP | 2002-37997 A | 2/2002 | |
| JP | 2005-200526 A | 7/2005 | |
| JP | 2006 143949 | 6/2006 | |
| JP | 2006-257299 A | 9/2006 | |
| JP | 2007-31583 A | 2/2007 | |
| JP | 2007-154173 A | 6/2007 | |
| JP | 2008-19405 A | 1/2008 | |
| JP | 2008-74952 A | 4/2008 | |
| JP | 2009 108281 | 5/2009 | |
| JP | 2009 143995 | 7/2009 | |
| JP | 2009 249550 | 10/2009 | |
| JP | 2010 65164 | 3/2010 | |
| JP | 2010-77366 A | 4/2010 | |
| JP | 2011-116839 A | 6/2011 | |
| WO | WO 2006/080798 A1 * | 8/2006 | ............... G02B 5/02 |
| WO | WO 2008/060714 A2 | 5/2008 | |
| WO | WO 2011/049228 A1 | 4/2011 | |

OTHER PUBLICATIONS

International Search Report Issued Aug. 30, 2011 in PCT/JP11/62137 Filed May 26, 2011.
Objection issued Oct. 30, 2015 in Japanese Patent Application No. 5714576 B.
Office Action issued Feb. 9, 2016 in Japanese Patent Application No. 2015-048165.

* cited by examiner

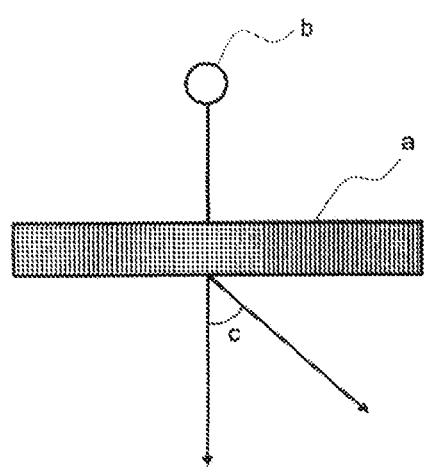

POLYCARBONATE RESIN COMPOSITION AND MOLDED POLYCARBONATE RESIN

TECHNICAL FIELD

The present invention relates to a polycarbonate resin composition and a polycarbonate resin molded body, in particular, a polycarbonate resin composition capable of providing a molded body that has a high light transmittance and high light-diffusing property, can be inhibited from yellowing, and has high thin-wall flame retardancy, and a polycarbonate resin molded body obtained by molding the polycarbonate resin composition.

BACKGROUND ART

In recent years, for example, a lighting equipment diffusion cover made of a resin to be used in LED lighting or the like has been required to have design and high flame retardancy. With regard to the flame retardancy, high flame retardancy that satisfies the V-0 standard in U.S. Underwriters Laboratory-94 (hereinafter, referred to as "UL-94") has been demanded. The difficulty with which the V-0 standard is satisfied is raised as a product thickness reduces. However, a large number of cases where a molded article thickness is reduced for design have been observed. In recent years, highly difficult flame retardancy that satisfies the V-0 standard even when the product thickness is 1.0 mm or less has been demanded.

For example, Patent Literatures 1 and 2 each describe, as a technology for improving the flame retardancy, that a light diffuser, a flame retardant, and a polytetrafluoroethylene are used in a polycarbonate resin to impart high flame retardancy and high optical characteristics. However, the flame retardancy is not sufficient. In addition, with regard to the optical characteristics, none of the literatures refers to yellow tint coloring caused by the addition of the polytetrafluoroethylene.

Further, a phosphorus-based flame retardant is used in each of Patent Literatures 1 and 2. However, none of the literatures refers to a reduction in heat resistance of a polycarbonate due to the use of the phosphorus-based flame retardant as a feature of the polycarbonate.

CITATION LIST

Patent Literature

[PTL 1] JP 2009-108281 A
[PTL 2] JP 2006-143949 A

SUMMARY OF INVENTION

Technical Problem

The present invention has been made to solve the problems, and an object of the present invention is to provide a polycarbonate resin composition capable of providing a molded body that has a high light transmittance and high light-diffusing property, can be inhibited from yellowing, and has high thin-wall flame retardancy, and a polycarbonate resin molded body obtained by molding the polycarbonate resin composition.

Solution to Problem

The inventors of the present invention have made extensive studies to achieve the object, and as a result, have found that the object is achieved with the following formulation including a branched polycarbonate as an essential component. Thus, the inventors have completed the present invention.

That is, the present invention is as follows.

(1) A flame-retardant light-diffusing polycarbonate resin composition, the composition having a viscosity-average molecular weight of 17,000 or more, including, with respect to 100 parts by mass of a polycarbonate (A) formed of 10 to 100 parts by mass of a branched polycarbonate (A-1) and 90 to 0 parts by mass of an aromatic polycarbonate (A-2), 0.1 to 5 parts by mass of a light diffuser (B), 0.01 to 1.0 part by mass of a flame retardant (C), 0 to 0.5 part by mass of a polytetrafluoroethylene (D), and 0 to 2 parts by mass of a polyorganosiloxane (E).

(2) The flame-retardant light-diffusing polycarbonate resin composition according to the above-mentioned item (1), further including 0.01 to 1.0 part by mass of an antioxidant (F) with respect to 100 parts by mass of the component (A).

(3) The flame-retardant light-diffusing polycarbonate resin composition according to the above-mentioned item (1) or (2), in which the component (C) includes an organic alkali metal salt and/or an organic alkali earth metal salt.

(4) The flame-retardant light-diffusing polycarbonate resin composition according to any one of the above-mentioned items (1) to (3), in which the component (D) includes an aqueous dispersion-type polytetrafluoroethylene.

(5) The flame-retardant light-diffusing polycarbonate resin composition according to any one of the above-mentioned items (1) to (3), in which the component (D) includes an acryl-coated polytetrafluoroethylene.

(6) The flame-retardant light-diffusing polycarbonate resin composition according to any one of the above-mentioned items (1) to (5), in which the component (E) includes a polyorganosiloxane having a phenyl group, a methoxy group, and a vinyl group.

(7) The flame-retardant light-diffusing polycarbonate resin composition according to any one of the above-mentioned items (1) to (6), in which the component (A-1) includes a branched polycarbonate having a branched core structure derived from a branching agent represented by the following general formula (I):

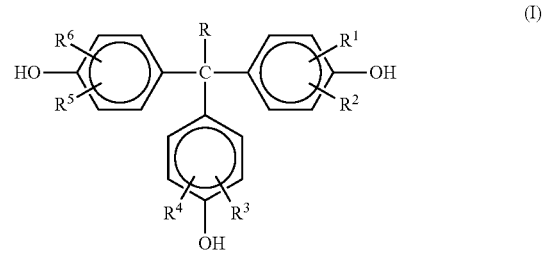

in the general formula (I), R represents hydrogen or an alkyl group having 1 to 5 carbon atoms, and $R^1$ to $R^6$ each independently represent hydrogen, an alkyl group having 1 to 5 carbon atoms, or a halogen atom.

(8) The flame-retardant light-diffusing polycarbonate resin composition according to the above-mentioned item (7), in which a usage of the branching agent represented by the general formula (I) in the component (A-1) falls within a range of 0.01 to 3.0 mol % with respect to a dihydric phenol compound as a raw material for the component (A-1).

(9) The flame-retardant light-diffusing polycarbonate resin composition according to the above-mentioned item (7) or (8), in which the branching agent represented by the general formula (I) includes 1,1,1-tris(4-hydroxyphenyl)ethane.

(10) The flame-retardant light-diffusing polycarbonate resin composition according to the above-mentioned item (9), in which a usage of 1,1,1-tris(4-hydroxyphenyl)ethane falls within a range of 0.2 to 2.0 mol % with respect to the dihydric phenol compound as a raw material for the component (A-1).

(11) The flame-retardant light-diffusing polycarbonate resin composition according to the above-mentioned item (10), in which the flame-retardant light-diffusing polycarbonate resin composition has a viscosity-average molecular weight of 17,000 or more and less than 22,000; the usage of 1,1,1-tris(4-hydroxyphenyl)ethane in the component (A-1) falls within a range of 0.2 mol or more and less than 1.0 mol % with respect to the dihydric phenol compound as a raw material for the component (A-1); and a content of the component (D) is 0.03 to 0.5 part by mass with respect to 100 parts by mass of the component (A).

(12) The flame-retardant light-diffusing polycarbonate resin composition according to the above-mentioned item (10), in which the flame-retardant light-diffusing polycarbonate resin composition has a viscosity-average molecular weight of 17,000 or more and less than 22,000; the usage of 1,1,1-tris(4-hydroxyphenyl)ethane in the component (A-1) falls within a range of 1.0 mol or more and less than 1.5 mol % with respect to the dihydric phenol compound as a raw material for the component (A-1); and a content of the component (D) is 0.01 to 0.5 part by mass with respect to 100 parts by mass of the component (A).

(13) The flame-retardant light-diffusing polycarbonate resin composition according to the above-mentioned item (9), in which: a usage of 1,1,1-tris(4-hydroxyphenyl)ethane in the component (A-1) is 1.5 mol % or more with respect to the dihydric phenol compound as a raw material for the component (A-1); and a content of the component (D) is 0 parts by mass.

(14) The flame-retardant light-diffusing polycarbonate resin composition according to any one of the above-mentioned items (1) to (10), in which the flame-retardant light-diffusing polycarbonate resin composition has a viscosity-average molecular weight of 22,000 or more.

(15) The flame-retardant light-diffusing polycarbonate resin composition according to the above-mentioned item (14), in which the component (B) includes an Si-based light diffuser.

(16) A polycarbonate resin molded body, which is obtained by molding the flame-retardant light-diffusing polycarbonate resin composition according to any one of the above-mentioned items (1) to (15).

(17) The polycarbonate resin molded body according to the above-mentioned item (16), in which the molded body includes a cover for lighting equipment.

(18) The polycarbonate resin molded body according to the above-mentioned item (16), in which the molded body includes a diffusion cover for display equipment.

(19) The polycarbonate resin molded body according to the above-mentioned item (16), in which the molded body includes a diffusing plate for a liquid crystal display.

Advantageous Effects of Invention

The use of the polycarbonate resin composition of the present invention can provide a polycarbonate resin molded body that has a highlight transmittance and high light-diffusing property, can be inhibited from yellowing, and has such high thin-wall flame retardancy that the V-0 standard is satisfied even when its thickness is 1 mm or less.

BRIEF DESCRIPTION OF DRAWINGS

FIG. 1 is a schematic view illustrating a method of measuring a diffusivity in the present invention.

DESCRIPTION OF EMBODIMENTS

A polycarbonate resin composition of the present invention includes, with respect to 100 parts by mass of a polycarbonate (A) formed of 10 to 100 parts by mass of a branched polycarbonate (A-1) and 90 to 0 parts by mass of an aromatic polycarbonate (A-2), 0.1 to 5 parts by mass of a light diffuser (B), 0.01 to 1.0 part by mass of a flame retardant (C), 0 to 0.5 part by mass of a polytetrafluoroethylene (D), and 0 to 2 parts by mass of a polyorganosiloxane (E).

The viscosity-average molecular weight of the polycarbonate resin composition of the present invention is 17,000 or more from the viewpoints of flame retardancy and moldability, and is preferably 17,000 to 26,000.

In addition, from the viewpoint of flame retardancy, the viscosity-average molecular weight of the polycarbonate resin composition of the present invention is more preferably 22,000 or more, still more preferably 22,000 to 26,000.

Hereinafter, each component of the polycarbonate resin composition of the present invention is described.

Although the branched polycarbonate (PC) (A-1) in the component (A) is not particularly limited as long as the branched polycarbonate is a polycarbonate having branches, the following branched polycarbonate is given as an example thereof. The branched polycarbonate has a branched core structure derived from a branching agent represented by the following general formula (I) and has a viscosity-average molecular weight of 15,000 to 40,000, preferably 17,000 to 30,000, more preferably 17,000 to 27,000, and the usage of the branching agent falls within the range of preferably 0.01 to 3 mol %, more preferably 0.1 to 2.0 mol % with respect to a dihydric phenol compound.

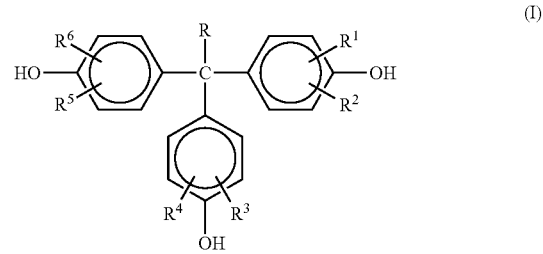

(I)

R represents hydrogen or an alkyl group having 1 to 5 carbon atoms such as a methyl group, an ethyl group, an n-propyl group, an n-butyl group, or an n-pentyl group. In addition, $R^1$ to $R^6$ each independently represent hydrogen, an alkyl group having 1 to 5 carbon atoms (such as a methyl group, an ethyl group, an n-propyl group, an n-butyl group, or an n-pentyl group), or a halogen atom (such as a chlorine atom, a bromine atom, or a fluorine atom).

More specifically, the branching agent represented by the general formula (I) is, for example, a compound having three or more functional groups, such as 1,1,1-tris(4-hydroxyphenyl)-methane,
1,1,1-tris(4-hydroxyphenyl)-ethane,
1,1,1-tris(4-hydroxyphenyl)-propane,
1,1,1-tris(2-methyl-4-hydroxyphenyl)-methane,
1,1,1-tris(2-methyl-4-hydroxyphenyl)-ethane,
1,1,1-tris(3-methyl-4-hydroxyphenyl)-methane,
1,1,1-tris(3-methyl-4-hydroxyphenyl)-ethane,
1,1,1-tris(3,5-dimethyl-4-hydroxyphenyl)-methane,
1,1,1-tris(3,5-dimethyl-4-hydroxyphenyl)-ethane,
1,1,1-tris(3-chloro-4-hydroxyphenyl)-methane,
1,1,1-tris(3-chloro-4-hydroxyphenyl)ethane,
1,1,1-tris(3,5-dichloro-4-hydroxyphenyl)-methane,
1,1,1-tris(3,5-dichloro-4-hydroxyphenyl)-ethane,
1,1,1-tris(3-bromo-4-hydroxyphenyl)-methane,
1,1,1-tris(3-bromo-4-hydroxyphenyl)-ethane,
1,1,1-tris(3,5-dibromo-4-hydroxyphenyl)-methane,
1,1,1-tris(3,5-dibromo-4-hydroxyphenyl)-ethane,
4,4'-[1-[4-[1-(4-hydroxyphenyl)-1-methylethyl]phenyl]ethylidene]bisphenol,
α,α',α''-tris(4-hydroxyphenyl)-1,3,5-triisopropylbenzene,
1-[α-methyl-α-(4'-hydroxyphenyl)ethyl]-4-[α',α'-bis(4''-hydroxyphenyl)ethyl]benzene, phloroglucin, trimellitic acid, or isatinbis(o-cresol). Of those, 1,1,1-tris(4-hydroxyphenyl)ethane is preferably used from the viewpoints of ease of availability, reactivity, and economical efficiency.

Each of those branching agents may be, used alone, or two or more kinds thereof may be used as a mixture.

In addition, when 1,1,1-tris(4-hydroxyphenyl)ethane is used as a branching agent, its usage is preferably 0.2 to 2.0 mol %, more preferably 0.3 to 2.0 mol %, still more preferably 0.4 to 1.9 mol % with respect to the dihydric phenol compound. When the usage is 0.2 mol % or more, the degree of freedom in blending increases. When the usage is 2.0 mol % or less, gelation hardly occurs during polymerization and hence the polycarbonate is easily produced.

The branched polycarbonate (A-1) in the component (A) has a branched core structure derived from the branching agent represented by the general formula (I) and is specifically represented by the following formula.

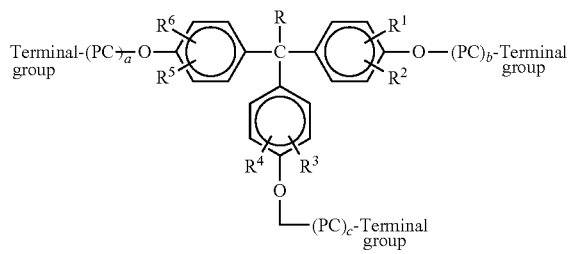

(In the formula, a, b, and c each represent an integer, and PC represents a polycarbonate moiety.)

For example, when bisphenol A is used as a raw material component, PC represents a repeating unit represented by the following formula.

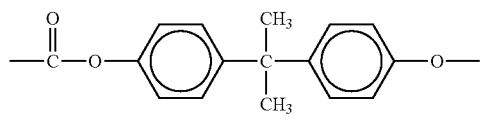

In addition, the amount of the branched polycarbonate (A-1) in the component (A) is 10 to 100 parts by mass, preferably 50 to 100 parts by mass. An effect of thin-wall flame retardancy is not obtained unless the amount of the branched polycarbonate is 10 parts by mass or more.

The aromatic polycarbonate (PC) (A-2) in the component (A) is an unbranched polycarbonate free of any halogen in its molecular structure, and is preferably a polymer having a structural unit represented by the following formula (II).

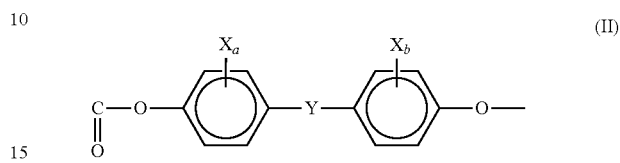

(In the formula, X's each represent a hydrogen atom or an alkyl group having 1 to 8 carbon atoms (such as a methyl group, an ethyl group, a propyl group, an n-butyl group, an isobutyl group, an amyl group, an isoamyl group, or a hexyl group) and when a plurality of X's exist, the X's may be identical to or different from each other, a and b each represent an integer of 1 to 4, and Y represents a single bond, an alkylene group having 1 to 8 carbon atoms or an alkylidene group having 2 to 8 carbon atoms (such as a methylene group, an ethylene group, a propylene group, a butylene group, a pentelylene group, a hexylene group, an ethylidene group, or an isopropylidene group), a cycloalkylene group having 5 to 15 carbon atoms or a cycloalkylidene group having 5 to 15 carbon atoms (such as a cyclopentylene group, a cyclohexylene group, a cyclopentylidene group, or a cyclohexylidene group), or an —S—, —SO—, —SO$_2$—, —O—, or —CO— bond, or a bond represented by the following formula (III) or (III').)

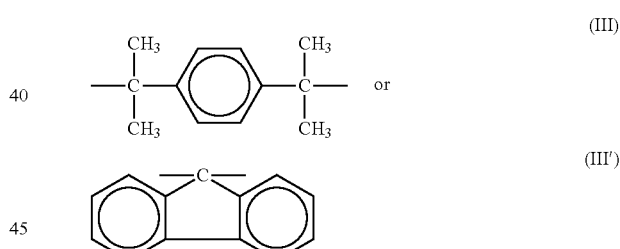

X is preferably a hydrogen atom, and Y is preferably an ethylene group or a propylene group.

The aromatic polycarbonate can be easily produced by causing a dihydric phenol represented by a formula (IV):

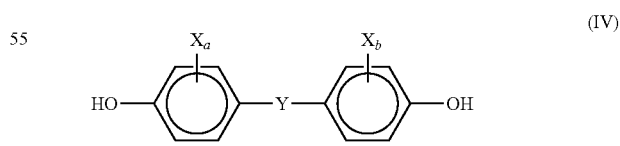

(in the formula, X, Y, a, and b each have the same meaning as that described above) and phosgene or a carbonic acid diester compound to react with each other. That is, the polycarbonate is produced by, for example, a reaction between the dihydric phenol and a carbonate precursor such as phosgene or an ester exchange reaction between the dihydric phenol and a carbonate precursor such as diphenyl carbonate in a solvent such as methylene chloride in the presence of a known acid receptor or viscosity-average molecular weight modifier.

In this context, various compounds are given as the dihydric phenol represented by the formula (IV). Examples thereof include:
dihydroxydiarylalkanes such as bis(4-hydroxyphenyl)methane,
bis(4-hydroxyphenyl)phenylmethane,
bis(4-hydroxyphenyl)naphthylmethane,
bis(4-hydroxyphenyl)-(4-isopropylphenyl)methane,
bis(3,5-dichloro-4-hydroxyphenyl)methane,
bis(3,5-dimethyl-4-hydroxyphenyl)methane,
1,1-bis(4-hydroxyphenyl)ethane,
1-naphthyl-1,1-bis(4-hydroxyphenyl)ethane,
1-phenyl-1,1-bis(4-hydroxyphenyl)ethane,
1,2-bis(4-hydroxyphenyl)ethane, 2,2-bis(4-hydroxyphenyl) propane (trivial name: bisphenol A),
2-methyl-1,1-bis(4-hydroxyphenyl)propane,
2,2-bis(3,5-dimethyl-4-hydroxyphenyl)propane,
1-ethyl-1,1-bis(4-hydroxyphenyl)propane,
2,2-bis(3-methyl-4-hydroxyphenyl)propane,
1,1-bis(4-hydroxyphenyl)butane, 2,2-bis(4-hydroxyphenyl) butane,
1,4-bis(4-hydroxyphenyl)butane, 2,2-bis(4-hydroxyphenyl) pentane,
4-methyl-2,2-bis(4-hydroxyphenyl)pentane,
2,2-bis(4-hydroxyphenyl)hexane, 4,4-bis(4-hydroxyphenyl) heptane,
2,2-bis(4-hydroxyphenyl)nonane, 1,10-bis(4-hydroxyphenyl)decane, and 1,1-bis(4-hydroxyphenyl)-3,3,5-trimethylcyclohexane; dihydroxydiarylcycloalkanes such as 1,1-bis(4-hydroxyphenyl)cyclohexane and 1,1-bis(4-hydroxyphenyl)cyclodecane; dihydroxydiaryl sulfones such as bis(4-hydroxyphenyl) sulfone and bis(3,5-dimethyl-4-hydroxyphenyl)sulfone; dihydroxydiaryl ethers such as bis(4-hydroxyphenyl)ether and bis(3,5-dimethyl-4-hydroxyphenyl)ether; dihydroxydiaryl ketones such as 4,4'-dihydroxybenzophenone and 3,3',5,5'-tetramethyl-4,4'-dihydroxybenzophenone;
dihydroxydiaryl sulfides such as bis(4-hydroxyphenyl) sulfide, bis(3-methyl-4-hydroxyphenyl) sulfide, and bis(3,5-dimethyl-4-hydroxyphenyl)sulfide; dihydroxydiaryl sulfoxides such as bis(4-hydroxyphenyl)sulfoxide;
dihydroxydiphenyls such as 4,4-dihydroxydiphenyl; and dihydroxyarylfluorenes such as 9,9-bis(4-hydroxyphenyl) fluorene. Of those, 2,2-bis(4-hydroxyphenyl)propane (trivial name: bisphenol A) is suitable.

Examples of the dihydric phenol other than the dihydric phenols each represented by the formula (IV) include: dihydroxybenzenes such as hydroquinone, resorcinol, and methylhydroquinone; and dihydroxynaphthalenes such as 1,5-dihydroxynaphthalene and 2,6-dihydroxynaphthalene. Each of those dihydric phenols may be used alone, or two or more kinds thereof may be used in combination. In addition, examples of the carbonic acid diester compound include diaryl carbonates such as diphenyl carbonate and dialkyl carbonates such as dimethyl carbonate and diethyl carbonate.

In addition, the molecular weight modifier may be a molecular weight modifier generally used in polymerization of polycarbonate, and various kinds of molecular weight modifiers can be used. Specific examples thereof include monohydric phenols such as phenol, p-cresol, p-tert-butylphenol, p-tert-octylphenol, p-cumylphenol, and nonylphenol. Further, the aromatic polycarbonate to be used in the present invention may be a mixture of two or more kinds of aromatic polycarbonates. In addition, the viscosity-average molecular weight of the aromatic polycarbonate is preferably 10,000 to 100,000, particularly suitably 20,000 to 40,000 in terms of mechanical strength and moldability.

The light diffuser as the component (B) is blended for imparting a light-diffusing effect. The light diffuser is not particularly limited and a known light diffuser can be used. Examples thereof include a crosslinked acrylic resin, a crosslinked polystyrene resin, a silicone resin, a fluorine-based resin, silica, quartz, titanium oxide, and zinc oxide. Of those, organic fine particles formed of the silicone resin are preferred because the fine particles have good stability against residence heat during molding or the like and have a flame retardancy-improving effect. The particle diameter of each of the fine particles is preferably 0.5 to 10 μm, more preferably 1 to 5 μm.

When the viscosity-average molecular weight of the polycarbonate resin composition of the present invention is 22,000 or more, the component (B) is preferably an Si-based light diffuser because excellent thin-wall flame retardancy is obtained without the incorporation of the polytetrafluoroethylene (D) to be described later. The Si-based light diffuser is blended for aiding the expression of the flame retardancy and imparting a light-diffusing effect. The Si-based light diffuser is not particularly limited as long as the Si-based light diffuser contains silicon (Si), and a known Si-based light diffuser can be used. Examples thereof include a silicone-based elastomer and a silicone resin. Of those, organic fine particles formed of the silicone resin are preferred because the fine particles have good stability against residence heat during molding or the like and have a flame retardancy-improving effect. The particle diameter of each of the fine particles is preferably 0.5 to 10 μm, more preferably 1 to 5 μm.

In addition, the amount of the component (B) to be blended into the polycarbonate resin composition of the present invention is 0.1 to 5 parts by mass, preferably 0.1 to 4 parts by mass, more preferably 0.1 to 3 parts by mass with respect to 100 parts by mass of the component (A), though the optimum value varies depending on the thickness of a molded article. When the amount is less than 0.1 part by mass, sufficient diffusing performance is not obtained. When the amount exceeds 5 parts by mass, the strength of the molded article reduces.

The flame retardant as the component (C) is blended for additionally improving the thin-wall flame retardancy of the polycarbonate resin composition of the present invention. Although the flame retardant is not particularly limited and a known flame retardant can be used, the flame retardant is preferably an organic alkali metal salt and/or an organic alkali earth metal salt (organic alkali (earth) metal salt).

In addition, in the present invention, it is not preferred to incorporate a phosphorus-based flame retardant.

Various salts can be given as examples of the organic alkali (earth) metal salt, and an alkali metal salt and an organic alkali earth metal salt of an organic acid or organic acid ester having at least one carbon atom can be used.

In this case, examples of the organic acid and the organic acid ester include an organic sulfonic acid and an organic carboxylic acid. On the other hand, examples of the alkali metal include lithium, sodium, potassium, and cesium. Examples of the alkali earth metal include magnesium, calcium, strontium, and barium. Of those, a salt of sodium or potassium is preferably used. In addition, the salt of the organic acid may be substituted with a halogen such as fluorine, chlorine, or bromine. One kind of the alkali metal salts and the organic alkali earth metal salts can be used alone, or two or more kinds thereof can be used in combination.

In the case of, for example, an organic sulfonic acid, an alkali metal salt and alkali earth metal salt of a perfluoroalkanesulfonic acid each represented by the following formula (1) out of the various organic alkali metal salts and organic alkali earth metal salts are preferably used.

$(C_eF_{2e+1}SO_3)_fM$      (1)

In the formula, e represents an integer of 1 to 10, M represents an alkali metal such as lithium, sodium, potassium, or cesium, or an alkali earth metal such as magnesium, calcium, strontium, or barium, and f represents the valence of M.

For example, compounds described in JP 47-40445 B correspond to these compounds.

Examples of the perfluoroalkanesulfonic acid represented by the formula (1) include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, and perfluorooctanesulfonic acid. In particular, potassium salts thereof are preferably used. Other examples include alkali metal salts of organic sulfonic acids such as p-toluenesulfonic acid, 2,5-dichlorobenzenesulfonic acid, 2,4,5-trichlorobenzenesulfonic acid, diphenyl sulfone-3-sulfonic acid, diphenyl sulfone-3,3'-disulfonic acid, and naphthalenetrisulfonic acid.

In addition, examples of the organic carboxylic acid include perfluoroformic acid, perfluoromethanecarboxylic acid, perfluoroethanecarboxylic acid, perfluoropropanecarboxylic acid, perfluorobutanecarboxylic acid, perfluoromethylbutanecarboxylic acid, perfluorohexanecarboxylic acid, perfluoroheptanecarboxylic acid, and perfluorooctanecarboxylic acid. Alkali metal salts of those organic carboxylic acids are used.

In addition, the amount of the component (C) to be blended into the polycarbonate resin composition of the present invention is 0.01 to 1.0 part by mass, preferably 0.03 to 0.5 part by mass, more preferably 0.05 to 0.2 part by mass with respect to 100 parts by mass of the component (A).

The polytetrafluoroethylene as the component (D) is blended for improving an anti-dripping effect and the flame retardancy. Although the polytetrafluoroethylene is not particularly limited and a known polytetrafluoroethylene can be used, the polytetrafluoroethylene is preferably an aqueous dispersion-type polytetrafluoroethylene or an acryl-coated polytetrafluoroethylene.

In addition, the amount of the component (D) to be blended into the polycarbonate resin composition of the present invention is 0 to 0.5 part by mass with respect to 100 parts by mass of the component (A). When the amount exceeds 0.5 part by mass, the amount of the aggregate of the polytetrafluoroethylene increases.

When the viscosity-average molecular weight of the polycarbonate resin composition of the present invention is 17,000 or more and less than 22,000, 1,1,1-tris(4-hydroxyphenyl)ethane is used as a branching agent in the component (A-1) of the polycarbonate resin composition, and the usage of the branching agent falls within the range of 0.2 mol % or more and less than 1.0 mol % with respect to the dihydric phenol compound as a raw material for the component (A-1), the content of the component (D) is preferably 0.03 to 0.5 part by mass, more preferably 0.03 to 0.2 part by mass, still more preferably 0.03 to 0.1 part by mass with respect to 100 parts by mass of the component (A) from the viewpoints of improvements in flame retardancy, optical characteristics, and moldability.

In addition, when the viscosity-average molecular weight of the polycarbonate resin composition of the present invention is 17,000 or more and less than 22,000, 1,1,1-tris(4-hydroxyphenyl)ethane is used as a branching agent in the component (A-1) of the polycarbonate resin composition, and the usage of the branching agent falls within the range of 1.0 mol % or more and less than 1.5 mol % with respect to the dihydric phenol compound as a raw material for the component (A-1), the content of the component (D) is preferably 0.01 to 0.5 part by mass, more preferably 0.01 to 0.2 part by mass, still more preferably 0.01 to 0.1 part by mass with respect to 100 parts by mass of the component (A).

When 1,1,1-tris(4-hydroxyphenyl)ethane is used as a branching agent in the component (A-1) of the polycarbonate resin composition of the present invention and the usage of the branching agent is 1.5 mol % or more with respect to the dihydric phenol compound as a raw material for the component (A-1), the content of the component (D) may be 0 parts by mass.

In addition, when the viscosity-average molecular weight of the polycarbonate resin composition of the present invention is 22,000 or more and 1,1,1-tris(4-hydroxyphenyl)ethane is used as a branching agent in the component (A-1) of the polycarbonate resin composition, the component (D) may be added at a content of 0 to 0.3 part by mass with respect to 100 parts by mass of the component (A) as required from the viewpoints of improvements in flame retardancy, optical characteristics, and moldability.

The polyorganosiloxane as the component (E) is blended for aiding the expression of the flame retardancy, reducing adhesion to a die, expressing a high transmittance, and preventing the occurrence of silver. Although the polyorganosiloxane is not particularly limited and a known polyorganosiloxane can be used, the polyorganosiloxane is preferably a polyorganosiloxane containing a methoxy group, particularly preferably a polyorganosiloxane having a phenyl group, a methoxy group, and a vinyl group.

In addition, the amount of the component (E) to be blended into the polycarbonate resin composition of the present invention is 0 to 2 parts by mass, preferably 0.03 to 1 part by mass, more preferably 0.05 to 0.5 part by mass with respect to 100 parts by mass of the component (A). When the amount added is more than 2 parts by mass, adhesion to a die occurs in injection molding.

A certain amount of an antioxidant (F) with respect to 100 parts by mass of the component (A) may be further added to the polycarbonate resin composition of the present invention.

The antioxidant prevents the reduction of the viscosity-average molecular weight, prevents the yellowing of the resin, and prevents the reduction of the transmittance. Although the antioxidant is not particularly limited and a known antioxidant can be used, the antioxidant is preferably, for example, an antioxidant represented by the following formula (2) or (3).

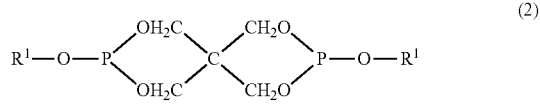

(2)

(In the formula, $R^1$'s each represent an aryl group or an alkyl group, and may be identical to or different from each other.)

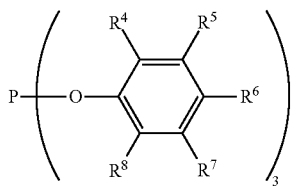

(3)

(In the formula, $R^4$ to $R^8$ each represent a hydrogen atom, an aryl group, or an alkyl group having 1 to 20 carbon atoms, and may be identical to or different from one another.)

In addition, the amount of the component (F) to be blended into the polycarbonate resin composition of the present invention is preferably 0.01 to 1.0 part by mass, more preferably 0.03 to 0.5 part by mass, still more preferably 0.04 to 0.2 part by mass with respect to 100 parts by mass of the component (A). When the amount is 0.01 part by mass or more, an inhibiting effect on the yellowing of the resin is high. When the amount is 1.0 part by mass or less, the durability of the composition is improved.

Further, in the present invention, any other additive component regularly used in a synthetic resin, elastomer, or thermoplastic resin can be incorporated as an arbitrary component as required. Examples of the additive component include antistatic agents, polyamide-polyether block copolymers (for imparting permanent antistatic performance), benzotriazole- and benzophenone-based UV absorbers, hindered amine-based light stabilizers (weathering agents), plasticizers, antibacterial agents, compatibilizers, and colorants (dyes and pigments).

The blending amount of the arbitrary component is not particularly limited as long as the characteristics of the polycarbonate resin composition of the present invention are maintained.

Next, description is given of a method of producing the polycarbonate resin composition of the present invention.

The polycarbonate resin composition of the present invention is obtained by: blending the respective components (A) to (E) at the above-mentioned ratios; further blending the component (F) and various arbitrary components to be used as required at proper ratios; and kneading the mixture.

The blending and the kneading in this case can each be performed by a method involving preliminarily mixing the components with an instrument that is typically used such as a ribbon blender or a drum tumbler, and then using a Henschel mixer, a Banbury mixer, a single-screw extruder, a twin-screw extruder, a multi-screw extruder, a co-kneader, or the like. A heating temperature at the time of the kneading is appropriately selected from the range of 240 to 320° C., generally. For the melt-kneading, an extrusion molding machine, in particular, a vent-type extrusion molding machine is preferably used.

It should be noted that any component to be incorporated other than the polycarbonate resin can be melt-kneaded with the polycarbonate resin or another thermoplastic resin in advance before being added: the component can be added as a master batch.

A polycarbonate resin molded body of the present invention is obtained by molding the polycarbonate resin composition produced as described above.

The polycarbonate resin molded body of the present invention can be each of various molded bodies produced using, as a raw material, a composition obtained by melt-kneading the polycarbonate resin composition of the present invention using the melt-kneading molding machine or a pellet obtained from the composition. In order to produce the various molded bodies, an injection molding method, an injection compression molding method, an extrusion molding method, a blow molding method, a press molding method, a vacuum molding method, a foam molding method, and the like can be used. In particular, the production of an injection-molded body by injection molding or injection compression molding can be suitably performed with the obtained pellet.

The polycarbonate resin molded body of the present invention can be suitably used as, for example, a cover for lighting equipment, a diffusion cover for display equipment, or a diffusing plate for display equipment such as a diffusing plate for a liquid crystal display.

EXAMPLES

Hereinafter, the present invention is described in more detail by way of examples, but the present invention is not limited to the following examples as long as it does not depart from the gist of the present invention.

Performance evaluation methods and raw materials used are as follows.
(Performance Evaluation Methods)
(1) Viscosity-Average Molecular Weight of Polycarbonate Resin Composition A viscosity-average molecular weight Mv was calculated from the following relational expression by measuring a limiting viscosity [η] of a methylene chloride solution at 20° C. with an Ubbelohde-type viscosity tube.

$$[\eta]=1.23\times10^{-5} Mv^{0.83}$$

(2) Flame Retardancy

A vertical flame test was performed with test pieces (each having a length of 127 mm, a width of 12.7 mm, and a thickness of 1 mm) produced in conformity with the UL standard 94. The test pieces were evaluated for their flame retardancy by being classified into classes "V-0," "V-1," "V-2," and "Not-V" on the basis of the results of the test.

It should be noted that the UL standard 94 is a method of evaluating a test piece having a predetermined size, which is held vertically, for its flame retardancy on the basis of an after flame time after the flame of a burner has been brought into contact with the test piece for 10 seconds.

(3) Heat Distortion Temperature (HDT)

Measurement was performed in conformity with ASTM D648 (load: 18.6 kg/cm², wall thickness: ⅛ mm, unit: ° C.).

The value serves as an index of heat resistance and a practically preferred range thereof is typically 80° C. or more, though the range varies depending on an intended use of the resin composition.

(4) Evaluation of Polytetrafluoroethylene (PTFE) Aggregate

Each of the resultant pellets was dried with hot air at 120° C. for 5 hours. After that, a flat plate measuring 40 mm by 40 mm by 2.0 mm was produced with a molding machine (Sumitomo-Nestal N515/150 manufactured by Sumitomo Heavy Industries, Ltd.) at a molding temperature of 280° C. and a die temperature of 80° C. The produced flat plate was placed on a light source having a constant light quantity and then evaluated by the following criteria.
A No aggregate exists.
B An aggregate is inconspicuous.
C An aggregate is conspicuous.
(5) Hue (YI value)

The hue of a test piece 40 mm on a side and having a thickness of 2 mm was measured with a spectrophotometer (Color-Eye 7000A manufactured by Gretag Macbeth).
(6) Total Light Transmittance (%)

Each of the resultant pellets was dried with hot air at 120° C. for 5 hours. After that, a sample was produced as a flat plate for total light transmittance measurement measuring 40 mm by 40 mm by 2.0 mm with a molding machine (Sumitomo-Nestal N515/150 manufactured by Sumitomo Heavy Industries, Ltd.) at a molding temperature of 280° C. and a die temperature of 80° C. The total light transmittance of the produced sample was measured with a testing machine manufactured by NIPPON DENSHOKU INDUSTRIES CO., LTD. in conformity with JIS K 7105.

(7) Diffusivity

The diffusivity of a flat plate-like test piece 40 mm on a side and having a thickness of 2 mm was measured with a dispersity-measuring instrument manufactured by NIPPON DENSHOKU INDUSTRIES CO., LTD. It should be noted that the term "diffusivity" refers to the following angle. When a light beam b is caused to impinge on the surface of a flat plate-like test piece a vertically from above in FIG. 1, the quantity of transmitted light at an angle c of 0° is regarded as being 100. The angle c at which the quantity of the transmitted light is 50 is defined as the diffusivity.

(Raw Materials Used)

Polycarbonate (PC) (A)

Branched polycarbonate (A-1)

Production Example 1

Production of Branched Polycarbonate Containing 0.40 mol % of THPE (Steps of Synthesizing Polycarbonate Oligomer)

2,000 Parts per million of sodium dithionite with respect to bisphenol A (BPA) to be dissolved later were added to a 5.6-wt % aqueous solution of sodium hydroxide, and then BPA was dissolved in the mixture so that a BPA concentration was 13.5 wt %. Thus, an aqueous solution of sodium hydroxide containing BPA was prepared.

In addition, 2,000 ppm of sodium dithionite with respect to 1,1,1-tris(4-hydroxyphenylethane) (THPE) to be dissolved later were added to a 5.6 wt %-aqueous solution of sodium hydroxide, and then THPE was dissolved in the mixture so that a THPE concentration was 11.3 wt %. Thus, an aqueous solution of sodium hydroxide containing THPE was prepared.

The aqueous solution of sodium hydroxide containing BPA, the aqueous solution of sodium hydroxide containing THPE, methylene chloride, and phosgene were continuously passed through a tubular reactor having an inner diameter of 6 mm and a tube length of 30 m at flow rates of 42 L/hr, 0.41 L/hr, 15 L/hr, and 4.0 kg/hr, respectively.

The tubular reactor had a jacket portion and the temperature of a reaction liquid was kept at 40° C. or less by passing cooling water through the jacket.

The reaction liquid that had exited the tubular reactor was continuously introduced into a baffled vessel-type reactor provided with a sweep-back wing and having an internal volume of 40 L. Further, 2.8 L/hr of the aqueous solution of sodium hydroxide containing BPA, 0.07 L/hr of a 25 wt %-aqueous solution of sodium hydroxide, L/hr of water, 0.69 L/hr of a 1 wt %-aqueous solution of triethylamine, and 5.2 L/hr of a solution of p-tert-butylphenol (PTBP) in methylene chloride (having a concentration of 4.0 wt %) were added to the mixture, and then the whole was subjected to a reaction.

An aqueous phase was separated and removed by continuously extracting the reaction liquid overflowing from the vessel-type reactor and then leaving the liquid at rest. Then, a methylene chloride phase was collected.

The polycarbonate oligomer solution thus obtained had a concentration of 329 g/L and a chloroformate group concentration of 0.74 mol/L.

(Steps of Producing Polycarbonate)

15 Liters of the polycarbonate oligomer solution produced in the foregoing, 10.2 L of methylene chloride, and 2.8 mL of triethylamine were loaded into a 50-L-vessel-type reactor provided with a baffle board, a paddle-type stirring blade, and a cooling jacket, and were then mixed.

An aqueous solution of sodium hydroxide containing BPA (prepared by dissolving 1,166 g of BPA in an aqueous solution prepared by dissolving 639 g of NaOH and 2.3 g of sodium dithionite in 9.3 L of water) was added to the mixed liquid, and then the whole was subjected to a polymerization reaction for 60 minutes.

10 Liters of methylene chloride were added to the reaction product for dilution and then the mixture was stirred for 10 minutes. After that, the mixture was separated into an organic phase containing a polycarbonate, and an aqueous phase containing excessive amounts of BPA and NaOH, and then the organic phase was isolated.

The solution of the polycarbonate in methylene chloride thus obtained was sequentially washed with a 0.03 mol/L-aqueous solution of sodium hydroxide and 0.2N hydrochloric acid in amounts of 15 vol % each with respect to the solution. Next, the washed product was repeatedly washed with pure water until an electric conductivity in the aqueous phase after the washing became 0.01 µS/m or less.

The solution of the polycarbonate in methylene chloride obtained by the washing was concentrated and pulverized, and then the resultant flake was dried under reduced pressure at 120° C.

The polycarbonate had a THPE content determined by NMR of 0.4 mol %, a viscosity number measured in conformity with ISO 1628-4 (1999) of 46.7, and a viscosity-average molecular weight Mv of 17,400.

Production Example 2

Production of Branched Polycarbonate Containing 0.85 mol % of THPE (Steps of Synthesizing Polycarbonate Oligomer)

2,000 Parts per million of sodium dithionite with respect to bisphenol A (BPA) to be dissolved later were added to a 5.6 wt %-aqueous solution of sodium hydroxide, and then BPA was dissolved in the mixture so that a BPA concentration was 13.5 wt %. Thus, an aqueous solution of sodium hydroxide containing BPA was prepared.

In addition, 2,000 ppm of sodium dithionite with respect to 1,1,1-tris(4-hydroxyphenylethane) (THPE) to be dissolved later were added to a 5.6 wt %-aqueous solution of sodium hydroxide, and then THPE was dissolved in the mixture so that a THPE concentration was 11.3 wt %. Thus, an aqueous solution of sodium hydroxide containing THPE was prepared.

The aqueous solution of sodium hydroxide containing BPA, the aqueous solution of sodium hydroxide containing THPE, methylene chloride, and phosgene were continuously passed through a tubular reactor having an inner diameter of 6 mm and a tube length of 30 m at flow rates of 42 L/hr, 0.87 L/hr, 15 L/hr, and 4.0 kg/hr, respectively.

The tubular reactor had a jacket portion and the temperature of a reaction liquid was kept at 40° C. or less by passing cooling water through the jacket.

The reaction liquid that had exited the tubular reactor was continuously introduced into a baffled vessel-type reactor provided with a sweep-back wing and having an internal volume of 40 L. Further, 2.8 L/hr of the aqueous solution of sodium hydroxide containing BPA, 0.07 L/hr of a 25 wt %-aqueous solution of sodium hydroxide, L/hr of water, 0.69 L/hr of a 1 wt %-aqueous solution of triethylamine, and 4.6 L/hr of a solution of p-tert-butylphenol (PTBP) in methylene chloride (having a concentration of 4.0 wt %) were added to the mixture, and then the whole was subjected to a reaction.

An aqueous phase was separated and removed by continuously extracting the reaction liquid overflowing from the vessel-type reactor and then leaving the liquid at rest. Then, a methylene chloride phase was collected.

The polycarbonate oligomer solution thus obtained had a concentration of 330 g/L and a chloroformate group concentration of 0.72 mol/L.

(Steps of Producing Polycarbonate)

15 Liters of the polycarbonate oligomer solution produced in the foregoing, 10.2 L of methylene chloride, and 2.8 mL of triethylamine were loaded into a 50-L-vessel-type reactor provided with a baffle board, a paddle-type stirring blade, and a cooling jacket, and were then mixed.

An aqueous solution of sodium hydroxide containing BPA (prepared by dissolving 1,166 g of BPA in an aqueous solution prepared by dissolving 639 g of NaOH and 2.3 g of sodium dithionite in 9.3 L of water) was added to the mixed liquid, and then the whole was subjected to a polymerization reaction for 60 minutes.

10 Liters of methylene chloride were added to the reaction product for dilution and then the mixture was stirred for 10 minutes. After that, the mixture was separated into an organic phase containing a polycarbonate, and an aqueous phase containing excessive amounts of BPA and NaOH, and then the organic phase was isolated.

The solution of the polycarbonate in methylene chloride thus obtained was sequentially washed with a 0.03 mol/L-aqueous solution of sodium hydroxide and 0.2N hydrochloric acid in amounts of 15 vol % each with respect to the solution. Next, the washed product was repeatedly washed with pure water until an electric conductivity in the aqueous phase after the washing became 0.01 μS/m or less.

The solution of the polycarbonate in methylene chloride obtained by the washing was concentrated and pulverized, and then the resultant flake was dried under reduced pressure at 120° C.

The polycarbonate had a THPE content determined by NMR of 0.85 mol %, a viscosity number measured in conformity with ISO 1628-4 (1999) of 55.2, and a viscosity-average molecular weight Mv of 22,800.

Production Example 3

Production of Branched Polycarbonate Containing 1.0 mol of THPE

A branched polycarbonate of Production Example 3 (containing 1.0 mol % of THPE) was obtained by the same method as that in Production Example 1 except that in the steps of synthesizing a polycarbonate oligomer, the supply of the aqueous solution of sodium hydroxide containing THPE was changed to 1.03 L/hr and the supply of the solution of PTBP in methylene chloride (having a concentration of 4.0 wt %) was changed to 6.0 L/hr.

The polycarbonate had a THPE content determined by NMR of 1.0 mol %, a viscosity number measured in conformity with ISO 1628-4 (1999) of 47.0, and a viscosity-average molecular weight Mv of 17,500.

Production Example 4

Production of Branched Polycarbonate Containing 1.5 mol of THPE

A branched polycarbonate of Production Example 4 (containing 1.5 mol of THPE) was obtained by the same method as that in Production Example 1 except that in the steps of synthesizing a polycarbonate oligomer, the supply of the aqueous solution of sodium hydroxide containing THPE was changed to 1.55 L/hr and the supply of the solution of PTBP in methylene chloride (having a concentration of 4.0 wt %) was changed to 6.8 L/hr.

The polycarbonate had a THPE content determined by NMR of 1.5 mol %, a viscosity number measured in conformity with ISO 1628-4 (1999) of 46.6, and a viscosity-average molecular weight Mv of 17,300.

Production Example 5

Production of Branched Polycarbonate Containing 1.90 mol of THPE (Steps of Synthesizing Polycarbonate Oligomer)

2,000 Parts per million of sodium dithionite with respect to BPA to be dissolved later were added to a 5.6 wt %-aqueous solution of sodium hydroxide, and then BPA was dissolved in the mixture so that a BPA concentration was 13.5 wt %. Thus, an aqueous solution of sodium hydroxide containing BPA was prepared.

In addition, 2,000 ppm of sodium dithionite with respect to THPE to be dissolved later were added to a 5.6 wt %-aqueous solution of sodium hydroxide, and then THPE was dissolved in the mixture so that a THPE concentration was 11.3 wt %. Thus, an aqueous solution of sodium hydroxide containing THPE was prepared.

The aqueous solution of sodium hydroxide containing BPA, the aqueous solution of sodium hydroxide containing THPE, methylene chloride, and phosgene were continuously passed through a tubular reactor having an inner diameter of 6 mm and a tube length of 30 m at flow rates of 42 L/hr, 2.0 L/hr, 15 L/hr, and 4.0 kg/hr, respectively.

The tubular reactor had a jacket portion and the temperature of a reaction liquid was kept at 40° C. or less by passing cooling water through the jacket.

The reaction liquid that had exited the tubular reactor was continuously introduced into a baffled vessel-type reactor provided with a sweep-back wing and having an internal volume of 40 L. Further, 2.8 L/hr of the aqueous solution of sodium hydroxide containing BPA, 0.07 L/hr of a 25 wt %-aqueous solution of sodium hydroxide, L/hr of water, 0.69 L/hr of a 1 wt %-aqueous solution of triethylamine, and 6.4 L/hr of a solution of PTBP in methylene chloride (having a concentration of 4.0 wt %) were added to the mixture, and then the whole was subjected to a reaction.

An aqueous phase was separated and removed by continuously extracting the reaction liquid overflowing from the vessel-type reactor and then leaving the liquid at rest. Then, a methylene chloride phase was collected.

The polycarbonate oligomer solution thus obtained had a concentration of 336 g/L and a chloroformate group concentration of 0.71 mol/L.

(Steps of Producing Polycarbonate)

15 Liters of the polycarbonate oligomer solution produced in the foregoing, 10.2 L of methylene chloride, and 2.8 mL of triethylamine were loaded into a 50-L-vessel-type reactor provided with a baffle board, a paddle-type stirring blade, and a cooling jacket, and were then mixed.

An aqueous solution of sodium hydroxide containing BPA (prepared by dissolving 1,166 g of BPA in an aqueous solution prepared by dissolving 639 g of NaOH and 2.3 g of sodium dithionite in 9.3 L of water) was added to the mixed liquid, and then the whole was subjected to a polymerization reaction for 60 minutes.

10 Liters of methylene chloride were added to the reaction product for dilution and then the mixture was stirred for 10 minutes. After that, the mixture was separated into an organic phase containing a polycarbonate, and an aqueous phase containing excessive amounts of BPA and NaOH, and then the organic phase was isolated.

The solution of the polycarbonate in methylene chloride thus obtained was sequentially washed with a 0.03-mol/L-aqueous solution of sodium hydroxide and 0.2N hydrochloric acid in amounts of 15 vol % each with respect to the solution. Next, the washed product was repeatedly washed with pure water until an electric conductivity in the aqueous phase after the washing became 0.01 μS/m or less.

The solution of the polycarbonate in methylene chloride obtained by the washing was concentrated and pulverized, and then the resultant flake was dried under reduced pressure at 120° C.

The polycarbonate had a THPE content determined by NMR of 1.9 mol %, a viscosity number measured in conformity with ISO 1628-4 (1999) of 55.2, and a viscosity-average molecular weight Mv of 22,800.

Aromatic Polycarbonate (A-2)
TARFLON FN1500 (manufactured by Idemitsu Kosan Co., Ltd., homopolycarbonate produced from bisphenol A, viscosity-average molecular weight: 14,500)
TARFLON FN1900A (manufactured by Idemitsu Kosan Co., Ltd., homopolycarbonate produced from bisphenol A, viscosity-average molecular weight: 19,500)
TARFLON FN2200A (manufactured by Idemitsu Kosan Co., Ltd., homopolycarbonate produced from bisphenol A, viscosity-average molecular weight: 21,500)
TARFLON FN2600A (manufactured by Idemitsu Kosan Co., Ltd., homopolycarbonate produced from bisphenol A, viscosity-average molecular weight: 26,000)
Light diffuser (B)
Crosslinked silicone resin particle (manufactured by Shin-Etsu Chemical Co., Ltd., trade name "KMP590")
Crosslinked (meth)acrylic polymer particle (manufactured by SEKISUI PLASTICS CO., Ltd., trade name "Techpolymer MBX-5": temperature at a weight reduction of 5%: 250° C.)

Flame retardant (C)
(Metal salt flame retardant)
Potassium perfluorobutanesulfonate (manufactured by Mitsubishi Materials Corporation, trade name "Eftop KFBS")
(Phosphorus-based flame retardant)
1,3-Phenylenebisdixylenylphosphate (manufactured by DAIHACHI CHEMICAL INDUSTRY CO., LTD., trade name "PX-200") PTFE (D)
Fluon AD938L (manufactured by ASAHI GLASS CO., LTD.: polytetrafluoroethylene: 60%, polyoxyalkylene alkyl ether: 3%, water: 37%)
Metablen A3800 (manufactured by MITSUBISHI RAYON CO., LTD.: polytetrafluoroethylene: 50%, polyalkyl (meth)acrylate having an alkyl group having 4 or more carbon atoms: 50%)
Fluon CD076 (manufactured by ASAHI GLASS CO., LTD.: polytetrafluoroethylene: 100%)
Polyorganosiloxane (E)
Reactive silicone compound (manufactured by Shin-Etsu Chemical Co., Ltd., trade name "KR511": containing a phenyl group, a methoxy group, and a vinyl group, refractive index=1.518)
Reactive silicone compound (manufactured by Dow Corning Toray Co., Ltd., trade name "DC3037": containing a methoxy group and a phenyl group, refractive index=1.49)
Antioxidant (F)
Phosphite-based antioxidant (manufactured by ADEKA CORPORATION, trade name "Adekastab PEP-36")
Hindered phenol-based antioxidant (manufactured by BASF, trade name "Irgafos (Irg) 168")

Examples 1-1 to 1-15 and 2-1 to 2-6, and
Comparative Examples 1-1 to 1-3 and 2-1 to 2-4

The respective components were mixed at ratios shown in any one of Table 1 and Table 2. The mixture was supplied to a vent-type twin-screw extrusion molding machine (TEM35 manufactured by TOSHIBA MACHINE CO., LTD.), and was then melt-kneaded at a barrel temperature of 300 to 320° C., a screw rotational frequency of 200 to 600 rotations, and a discharge amount of 10 to 30 kg/hr. Thus, a pellet sample for evaluation was obtained.

Viscosity-average molecular weight measurement was performed with the pellet sample for evaluation. In addition, a test piece to be subjected to each test was produced with an injection molding machine, and then each test was performed. Table 1 and Table 2 show the results.

TABLE 1

| | | | | | Example | | | | | | | |
| --- | --- | --- | --- | --- | --- | --- | --- | --- | --- | --- | --- | --- |
| | | | | 1-1 | 1-2 | 1-3 | 1-4 | 1-5 | 1-6 | 1-7 | 1-8 | 1-9 |
| Formulation (part(s) by mass) | PC (A) | (A-1) | THPE 0.40 mol % | | | | | | | | | |
| | | | THPE 0.85 mol % | 40 | 50 | 50 | 50 | 50 | 40 | 50 | 90 | 30 |
| | | | THPE 1.00 mol % | | | | | | | | | |
| | | | THPE 1.50 mol % | | | | | | | | | |
| | | (A-2) | FN1500 | 60 | 50 | 50 | 50 | 50 | 60 | 50 | 10 | 70 |
| | | | FN1900A | | | | | | | | | |
| | | | FN2200A | | | | | | | | | |

TABLE 1-continued

| | | | | | | | | | | | |
|---|---|---|---|---|---|---|---|---|---|---|---|
| | Light diffuser (B) | KMP590 | 0.1 | 0.1 | 0.5 | 0.5 | 1 | 1.5 | | 0.5 | 0.5 |
| | | MBX-5 | | | | | | | 0.5 | | |
| | Flame retardant (C) | Metal salt: KFBS | 0.1 | 0.1 | 0.05 | 0.2 | 0.1 | 0.1 | 0.1 | 0.1 | 0.1 |
| | | Phosphorus-based flame retardant: PX-200 | | | | | | | | | |
| | PTFE (D) | AD938L | 0.1 | 0.1 | 0.1 | 0.1 | 0.1 | 0.1 | 0.1 | 0.1 | |
| | | A3800 | | | | | | | | | |
| | | CD076 | | | | | | | | | 0.3 |
| | Polyorgano-siloxane (E) | KR511 | 0.3 | | 0.3 | 0.3 | 0.3 | 0.3 | | 0.3 | 0.3 |
| | | DC3037 | | | | | | | | | |
| | Antioxidant (F) | PEP-36 | 0.1 | 0.1 | 0.1 | 0.1 | 0.1 | 0.1 | 0.1 | 0.1 | |
| | | Irg. 168 | | | | | | | | | 0.1 |
| Evaluation | Viscosity-average molecular weight | | 17,800 | 18,500 | 18,500 | 18,500 | 18,500 | 17,800 | 18,500 | 21,300 | 17,100 |
| | Flame retardancy | | V-0 | V-0 | V-0 | V-0 | V-0 | V-0 | V-0 | V-0 | V-0 |
| | Heat distortion temperature (° C.) | | 130 | 130 | 130 | 130 | 130 | 130 | 130 | 130 | 130 |
| | PTFE aggregate | | A | A | A | A | A | A | A | A | A |
| | YI value (yellowness) | | 6.1 | 6.1 | 4.5 | 4.5 | 1.9 | 1.6 | 8.8 | 4.5 | 8.0 |
| | Transmittance (%) | | 81.5 | 80.8 | 58.9 | 58.8 | 55.3 | 53.7 | 88.3 | 58.9 | 58.2 |
| | Diffusivity (°) | | 6 | 6 | 56 | 56 | 62 | 63 | 19 | 56 | 52 |

| | | | Example | | | | | | Comparative Example | | |
|---|---|---|---|---|---|---|---|---|---|---|---|
| | | | 1-10 | 1-11 | 1-12 | 1-13 | 1-14 | 1-15 | 1-1 | 1-2 | 1-3 |
| Formulation (part(s) by mass) | PC (A) (A-1) | THPE 0.40 mol % | 100 | 100 | | | | | | | |
| | | THPE 0.85 mol % | | | | | | | 50 | | 50 |
| | | THPE 1.00 mol % | | | 100 | | 100 | | | | |
| | | THPE 1.50 mol % | | | | 100 | | | | | |
| | (A-2) | FN1500 | | | | | | | 50 | | 50 |
| | | FN1900A | | | | | | | | 100 | |
| | | FN2200A | | | | | | | | | 100 |
| | Light diffuser (B) | KMP590 | 0.5 | 0.5 | 0.5 | 0.5 | | 0.5 | 0.5 | 0.5 | 0.1 |
| | | MBX-5 | | | | | 3 | | | | |
| | Flame retardant (C) | Metal salt: KFBS | 0.1 | 0.1 | 0.1 | 0.1 | 0.1 | 0.1 | 0.1 | | 0.1 |
| | | Phosphorus-based flame retardant: PX-200 | | | | | | | | 7 | |
| | PTFE (D) | AD938L | 0.1 | 0.07 | 0.04 | | 0.3 | 0.1 | 0.1 | 0.1 | |
| | | A3800 | | | | | | | | | |
| | | CD076 | | | | | | | | | 0.6 |
| | Polyorgano-siloxane (E) | KR511 | 0.5 | 0.3 | 0.3 | 0.2 | 0.3 | | 0.3 | 0.3 | |
| | | DC3037 | | | | | | 0.4 | | | |
| | Antioxidant (F) | PEP-36 | 0.1 | 0.1 | 0.1 | 0.1 | 0.1 | 0.1 | | | |
| | | Irg. 168 | | | | | | | 0.1 | 0.1 | 0.1 |
| Evaluation | Viscosity-average molecular weight | | 17,400 | 17,400 | 17,500 | 17,300 | 17,500 | 18,500 | 19,000 | 22,000 | 18,500 |
| | Flame retardancy | | V-0 | V-0 | V-0 | V-0 | V-0 | V-0 | V-2 | V-1 | V-0 |
| | Heat distortion temperature (° C.) | | 130 | 130 | 130 | 130 | 130 | 130 | 130 | 107 | 130 |
| | PTFE aggregate | | A | A | A | — | B | A | A | A | C |
| | YI value (yellowness) | | 4.5 | 5.4 | 5.3 | 3.9 | 5.5 | 4.6 | 4.5 | 4.7 | 9.0 |
| | Transmittance (%) | | 59.0 | 61.1 | 62.7 | 64.8 | 59.5 | 59.0 | 59.1 | 58.8 | 59.6 |
| | Diffusivity (°) | | 56 | 52 | 51 | 45 | 58 | 56 | 55 | 56 | 37 |

TABLE 2

| | | | Example | | | | |
|---|---|---|---|---|---|---|---|
| | | | 2-1 | 2-2 | 2-3 | 2-4 | 2-5 |
| Formulation (part(s) by mass) | PC (A) (A-1) | THPE 0.85 mol % | 100 | 100 | 100 | 100 | 70 |
| | | THPE 1.90 mol % | | | | | |
| | (A-2) | FN2200A | | | | | |
| | | FN2600A | | | | | 30 |

TABLE 2-continued

|  |  |  |  |  |  |  |  |
|---|---|---|---|---|---|---|---|
|  | Light diffuser (B) | KMP590 MBX-5 | 0.3 | 0.5 | 1.0 | 0.5 | 1.0 |
|  | Flame retardant (C) | Metal salt: KFBS Phosphorus-based flame retardant: PX-200 | 0.1 | 0.1 | 0.2 | 0.05 | 0.1 |
|  | Polyorgano-siloxane(E) | KR511 DC3037 |  |  |  | 0.3 | 0.3 |
|  | Antioxidant(F) | PEP-36 Irg. 168 |  | 0.1 | 0.1 | 0.1 | 0.1 |
| Evaluation | Viscosity-average molecular weight |  | 22,000 | 22,000 | 22,000 | 22,000 | 24,400 |
|  | Flame retardancy |  | V-0 | V-0 | V-0 | V-0 | V-0 |
|  | Heat distortion temperature (° C.) |  | 131 | 131 | 132 | 131 | 131 |
|  | YI value (yellowness) |  | 4.23 | 3.89 | 1.45 | 3.80 | 1.41 |
|  | Transmittance (%) |  | 74.59 | 64.58 | 55.70 | 65.12 | 56.11 |
|  | Diffusivity (°) |  | 25 | 45 | 60 | 45 | 60 |

|  |  |  |  | Example | Comparative Example | | | |
|---|---|---|---|---|---|---|---|---|
|  |  |  |  | 2-6 | 2-1 | 2-2 | 2-3 | 2-4 |
| Formulation (part(s) by mass) | PC (A) | (A-1) | THPE 0.85 mol % |  | 100 |  |  | 100 |
|  |  |  | THPE 1.90 mol % | 50 |  |  |  |  |
|  |  | (A-2) | FN2200A |  |  | 100 | 100 |  |
|  |  |  | FN2600A | 50 |  |  |  |  |
|  | Light diffuser (B) | KMP590 MBX-5 | 0.5 |  | 0.5 | 0.5 | 0.5 |
|  | Flame retardant (C) | Metal salt: KFBS | 0.1 | 0.1 | 0.1 |  |  |
|  |  | Phosphorus-based flame retardant: PX-200 |  |  |  | 7 | 7 |
|  | Polyorgano-siloxane(E) | KR511 DC3037 | 0.3 |  |  |  |  |
|  | Antioxidant(F) | PEP-36 Irg. 168 | 0.1 | 0.1 | 0.1 | 0.1 | 0.1 |
| Evaluation | Viscosity-average molecular weight |  | 24,500 | 22,000 | 22,000 | 21,500 | 21,500 |
|  | Flame retardancy |  | V-0 | Not-V | V-2 | V-2 | V-1 |
|  | Heat distortion temperature (° C.) |  | 132 | 131 | 131 | 107 | 107 |
|  | YI value (yellowness) |  | 3.82 | 1.30 | 3.93 | 3.99 | 3.97 |
|  | Transmittance (%) |  | 65.02 | 90.70 | 64.38 | 64.27 | 64.33 |
|  | Diffusivity (°) |  | 45 | 2 | 45 | 44 | 45 |

As shown in Table 1, a resin molded body obtained from each of the polycarbonate resin compositions of Examples 1-1 to 1-15 has a high light transmittance and high light-diffusing property, is inhibited from yellowing, and has high thin-wall flame retardancy. In addition, Examples 1-1 to 1-12, 1-14, and 1-15 each containing the polytetrafluoroethylene (D) are good because the amount of the PTFE aggregate to be produced is small in each of the examples.

In contrast, the polycarbonate resin compositions of Comparative Examples 1-1 and 1-2 are each free of the branched polycarbonate as the component (A-1). Accordingly, the compositions are inferior in flame retardancy to Examples 1-1 to 1-8 each containing the same amount of the polytetrafluoroethylene (D) as that of each of the compositions, despite the fact that their viscosity-average molecular weights are high. It should be noted that the heat distortion temperature in Comparative Example 1-2 lowers as compared with that in the case where the metal salt flame retardant is used because the phosphorus-based flame retardant is used in the comparative example.

Comparative Example 1-3 is unsuitable for a product because the comparative example contains the polytetrafluoroethylene (D) in an amount exceeding 0.5 part by mass and hence a large amount of the PTFE aggregate is produced. In addition, comparison between Comparative Example 1-3, and Examples 1-1 and 1-2 each containing the same amount of the light diffuser (B) as that of Comparative Example 1-3 shows that Comparative Example 1-3 containing a large amount of the PTFE has a higher diffusivity than those of the examples. Accordingly, the PTFE is considered to serve also as a diffuser. However, comparison between Comparative Example 1-3, and Examples 1-8 and 1-10 having transmittances comparable to that of Comparative Example 1-3 shows that Comparative Example 1-3 is inferior in diffusivity to the examples and has an extremely high YI value as compared with those of the examples. That is, the incorporation of the PTFE (D) in an amount exceeding 0.5 part by mass causes reductions in transmittance and diffusion efficiency, and an increase in YI value.

Further, as shown in Table 2, a resin molded body obtained from each of the polycarbonate resin compositions of Examples 2-1 to 2-6 has a high light transmittance and high light-diffusing property, is inhibited from yellowing, and has high thin-wall flame retardancy. In particular, the polycarbonate resin composition of each of Examples 2-1 to 2-6 has a viscosity-average molecular weight of 22,000 or more, and its component (B) is the Si-based light diffuser. Accordingly, the composition can achieve such high thin-wall flame retardancy that the V-0 standard is satisfied even when its thickness is 1 mm or less without the incorporation of the polytetrafluoroethylene (D).

In contrast, resin molded bodies obtained from the polycarbonate resin compositions of Comparative Example 2-1 free of the component (B), Comparative Example 2-2 free of the component (A-1), and Comparative Examples 2-3 and 2-4 each containing more than 1.0 part by mass of the component (C) with respect to 100 parts by mass of the component (A) each have low thin-wall flame retardancy. Further, Comparative Example 2-1 has low light-diffusing property, and Comparative Examples 2-3 and 2-4 each using the phosphorus-based flame retardant have lower heat distortion temperatures than that in the case where the metal salt flame retardant is used.

INDUSTRIAL APPLICABILITY

As detailed above, the use of the polycarbonate resin composition of the present invention provides a polycarbonate resin molded body that has a high light transmittance and high light-diffusing property, can be inhibited from yellowing, and has such high thin-wall flame retardancy that the V-0 standard is satisfied even when its thickness is 1 mm or less.

Accordingly, the polycarbonate resin molded body of the present invention is useful as a cover for lighting equipment, a diffusion cover for display equipment, or a diffusing plate for display equipment such as a diffusing plate for a liquid crystal display.

REFERENCE SIGNS LIST a flat plate-like test piece
b light source
c angle of diffused light

The invention claimed is:
1. A flame-retardant light-diffusing polycarbonate resin composition comprising, a polycarbonate (A) comprising 10 to 100 parts by mass of a branched polycarbonate (A-1) and 90 to 0 parts by mass of an aromatic polycarbonate (A-2), and, with respect to 100 parts by mass of the polycarbonate (A):
from 0.1 to 5 parts by mass of a light diffuser (B);
from 0.01 to 1.0 part by mass of a flame retardant (C);
from a non-zero amount to 0.5 parts by mass of an aqueous dispersion polytetrafluoroethylene or an acryl coated polytetrafluoroethylene (D); and
from 0 to 2 parts by mass of a polyorganosiloxane (E), wherein the resin composition has a viscosity average molecular weight of 17,000 or more; and
wherein a molded body of said resin composition has a light transmittance of 53.7% or more and a diffusivity of at least 19°.
2. The resin composition of claim 1, further comprising: 0.01 to 1.0 part by mass of an antioxidant (F), with respect to 100 parts by mass of the component (A).
3. The resin composition of claim 1, wherein the component (C) comprises an organic alkali metal salt, an organic alkali earth metal salt, or a mixture thereof.
4. The resin composition of claim 1, wherein the component (D) comprises an aqueous dispersion polytetrafluoroethylene.

5. The resin composition of claim 1, wherein the component (D) comprises an acryl-coated polytetrafluoroethylene.
6. The resin composition of claim 1, wherein the component (E) is present and comprises a polyorganosiloxane comprising a phenyl group, a methoxy group, and a vinyl group.
7. The resin composition of claim 1, wherein the component (A-1) comprises a branched polycarbonate comprising a branched core structure comprising, in reacted form, a branching agent of formula (I):

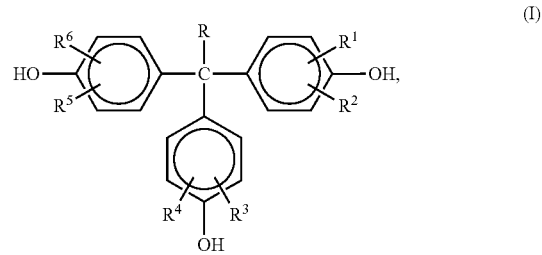

wherein:
R is hydrogen or an alkyl group comprising 1 to 5 carbon atoms; and
$R^1$ to $R^6$ are each independently hydrogen, an alkyl group comprising 1 to 5 carbon atoms, or a halogen atom.
8. The resin composition of claim 7, wherein an amount of the branching agent of formula (I) in the component (A-1) is within a range of 0.01 to 3.0 mol %, with respect to a dihydric phenol compound as a raw material for the component (A-1).
9. The resin composition of claim 7, wherein the branching agent of formula (I) comprises 1,1,1-tris(4-hydroxyphenyl)ethane.
10. The resin composition of claim 9, wherein an amount of 1,1,1-tris(4-hydroxyphenyl)ethane is within a range of 0.2 to 2.0 mol % with respect to a dihydric phenol compound as a raw material for the component (A-1).
11. The resin composition of claim 10, having a viscosity-average molecular weight of from 17,000 to 22,000,
wherein the amount of 1,1,1-tris(4-hydroxyphenyl)ethane in the component (A-1) is within a range of from 0.2 to 1.0 mol %, with respect to the dihydric phenol compound as a raw material for the component (A-1), and
wherein a content of the component (D) is 0.03 to 0.5 part by mass, with respect to 100 parts by mass of the component (A).
12. The resin composition of claim 10, having a viscosity-average molecular weight of from 17,000 to 22,000,
wherein the amount of 1,1,1-tris(4-hydroxyphenyl)ethane in the component (A-1) is within a range of from 1.0 to 1.5 mol %, with respect to the dihydric phenol compound as a raw material for the component (A-1), and
wherein a content of the component (D) is 0.01 to 0.5 part by mass, with respect to 100 parts by mass of the component (A).
13. The resin composition of claim 1, having a viscosity-average molecular weight of 22,000 or more.
14. The resin composition of claim 13, wherein the component (B) comprises a Si-comprising light diffuser.
15. The resin composition of claim 1, comprising from 0.3 to 5 parts by mass of the light diffuser (B).

16. The resin composition of claim 1, wherein said molded body of said resin composition has a light transmittance of no more than 88.3%.

17. The resin composition of claim 1, wherein said molded body of said resin composition has a diffusivity of no more than 63°.

18. The resin composition of claim 1, having a flame retardancy of V-0 at a thickness of 1.0 mm.

19. The resin composition of claim 1, wherein a content of said flame retardant (C) is 0.03 to 1.0 parts by mass, with respect to 100 parts by mass of component (A).

20. A polycarbonate resin molded body obtained by molding the flame-retardant light-diffusing polycarbonate resin composition of claim 1.

21. The polycarbonate resin molded body of claim 20, comprising a cover for lighting equipment.

22. The polycarbonate resin molded body of claim 20, comprising a diffusion cover for display equipment.

23. The polycarbonate resin molded body according to claim 20, comprising a diffusing plate for a liquid crystal display.

24. A flame-retardant light-diffusing polycarbonate resin composition comprising, a polycarbonate (A) comprising 10 to 100 parts by mass of a branched polycarbonate (A-1) and 90 to 0 parts by mass of an aromatic polycarbonate (A-2), and, with respect to 100 parts by mass of the polycarbonate (A):
from 0.1 to 5 parts by mass of a light diffuser (B);
from 0.01 to 1.0 part by mass of a flame retardant (C);
0 parts by mass of a polytetrafluoroethylene (D); and
from 0 to 2 parts by mass of a polyorganosiloxane (E),
wherein the resin composition has a viscosity average molecular weight of 17,000 or more,
said branched polycarbonate (A-1) has a branched core structure derived from a branching agent represented by the following general formula (I), and the usage of said branching agent falls within the range of 0.85 to 3.0 mol % and
wherein a molded body of said resin composition has a light transmittance of 53.7% or more and a diffusivity of at least 19°:

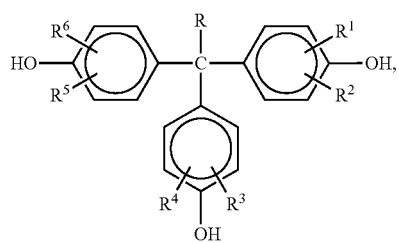

wherein:
R is hydrogen or an alkyl group comprising 1 to 5 carbon atoms; and $R^1$ to $R^6$ are each independently hydrogen, an alkyl group comprising 1 to 5 carbon atoms or a halogen atom.

25. The resin composition of claim 24, further comprising:
0.01 to 1.0 part by mass of an antioxidant (F), with respect to 100 parts by mass of the component (A).

26. The resin composition of claim 24, wherein the component (C) comprises an organic alkali metal salt, an organic alkali earth metal salt, or a mixture thereof.

27. The resin composition of claim 24, wherein the component (E) is present and comprises a polyorganosiloxane comprising a phenyl group, a methoxy group, and a vinyl group.

28. The resin composition of claim 24, wherein the branching agent of formula (I) comprises 1,1,1-tris(4-hydroxyphenyl)ethane.

29. The resin composition of claim 24, wherein an amount of 1,1,1-tris(4-hydroxyphenyl)ethane is within a range of 0.85 to 2.0 mol % with respect to a dihydric phenol compound as a raw material for the component (A-1).

30. The resin composition of claim 24, having a viscosity-average molecular weight of 22,000 or more.

31. The resin composition of claim 30, wherein the component (B) comprises a Si-comprising light diffuser.

32. The resin composition of claim 24, comprising from 0.3 to 5 parts by mass of the light diffuser (B).

33. The resin composition of claim 24, wherein said molded body of said resin composition has a light transmittance of no more than 88.3%.

34. The resin composition of claim 24, wherein said molded body of said resin composition has a diffusivity of no more than 63°.

35. The resin composition of claim 24, having a flame retardancy of V-0 at a thickness of 1.0 mm.

36. The resin composition of claim 24, wherein a content of said flame retardant (C) is 0.03 to 1.0 parts by mass, with respect to 100 parts by mass of component (A).

37. A polycarbonate resin molded body obtained by molding the flame-retardant light-diffusing polycarbonate resin composition of claim 24.

38. The polycarbonate resin molded body of claim 37, comprising a cover for lighting equipment.

39. The polycarbonate resin molded body of claim 37, comprising a diffusion cover for display equipment.

40. The polycarbonate resin molded body of claim 37, comprising a diffusing plate for a liquid crystal display.

* * * * *